United States Patent [19]
Parker et al.

[11] Patent Number: 5,721,032
[45] Date of Patent: Feb. 24, 1998

[54] PUZZLE CUT SEAMED BELT WITH STRENGTH ENHANCING STRIP

[75] Inventors: Thomas C. Parker; Edward L. Schlueter, Jr., both of Rochester; Laurence J. Lynd, Macedon; Lucille M. Sharf, Pittsford, all of N.Y.

[73] Assignee: Xerox Corporation, Stamford, Conn.

[21] Appl. No.: 522,622

[22] Filed: Aug. 31, 1995

Related U.S. Application Data

[63] Continuation of Ser. No. 297,198, Aug. 29, 1994, abandoned.

[51] Int. Cl.$^6$ .............................. F16G 1/00; F16G 15/30
[52] U.S. Cl. .................. 428/57; 428/192; 428/213; 24/38; 474/253
[58] Field of Search .......................... 428/209, 192, 428/193, 194, 195, 200, 223, 213, 57; 474/253; 24/38

[56] References Cited

U.S. PATENT DOCUMENTS

| | | | |
|---|---|---|---|
| 766,930 | 8/1904 | Clemons . | |
| 1,303,687 | 8/1919 | Leffler | 24/38 |
| 2,060,906 | 11/1936 | Snyder | 24/38 |
| 2,069,362 | 2/1937 | Ford | 24/38 |
| 2,441,460 | 5/1948 | Walters | 24/38 |
| 2,461,859 | 11/1949 | Vasselli | 24/38 |
| 2,792,318 | 5/1957 | Welch | 24/38 |
| 3,300,826 | 1/1967 | Read | 24/38 |
| 3,342,656 | 9/1967 | Papageorges | 24/38 |
| 3,729,873 | 5/1973 | Sandell | 451/531 |
| 4,063,463 | 12/1977 | Nordengren | 74/231 J |
| 4,808,657 | 2/1989 | Brown | 524/518 |
| 4,899,868 | 2/1990 | Johnson | 198/520 |
| 5,092,823 | 3/1992 | Longo | 474/253 |
| 5,514,436 | 5/1996 | Schlueter, Jr. et al. | 427/57 |

*Primary Examiner*—Kathleen Choi
*Attorney, Agent, or Firm*—Samuel E. Mott; Zosan S. Soong; Annette L. Bade

[57] ABSTRACT

An endless flexible seamed belt formed by joining two ends of material from which the belt is fabricated each end of which has a plurality of mutually mating elements in a puzzle cut pattern which are in interlocking relationship to prevent separation of the ends and which form a seam when joined mechanically to enable the flexible belt to essentially function as an endless belt having a substantially uniform thickness, said seam having voids between mutually mating elements at least partially filled with a seam strength enhancing material which is chemically and physically compatible with the material from which the belt is fabricated and which substance applied as a strip or on a strip over the seam and is bound to said belt material, said bond having been formed by the application of heat and/or pressure to a strip of said compatible placed material on at least one side of the seam at least substantially covering the seam. The strip may include a substrate with a coating of the compatible material which is removed after the bond is formed.

19 Claims, 7 Drawing Sheets

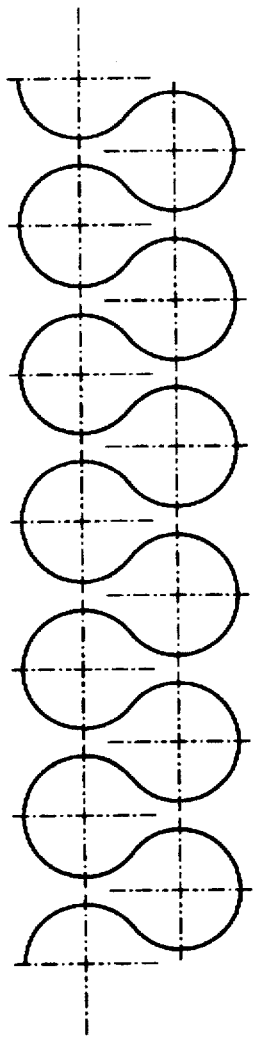
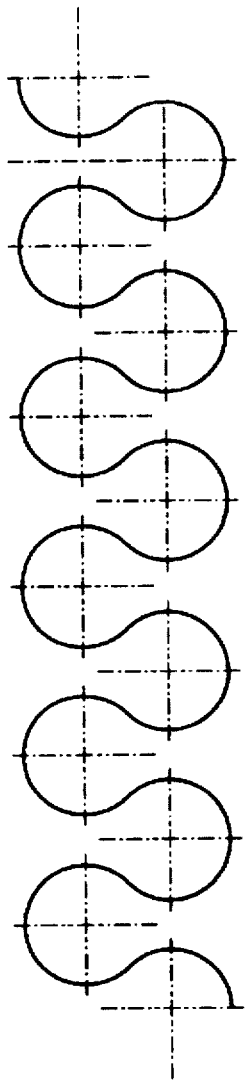
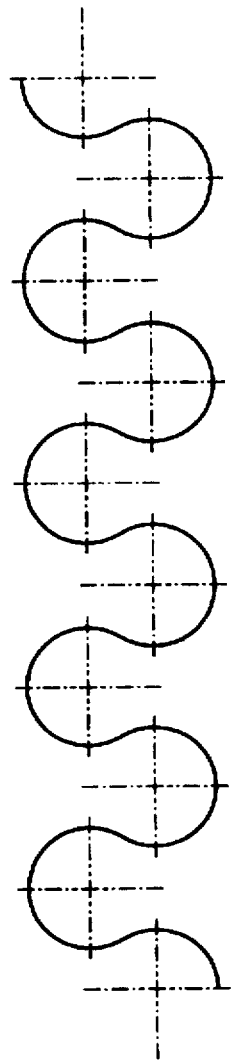
FIG. 6A  FIG. 6B  FIG. 6C

PUZZLE CUT SEAMED BELT WITH STRENGTH ENHANCING STRIP

CROSS REFERENCE TO RELATED APPLICATION

This is a continuation application under 37 CRF 1.62 of parent U.S. application Ser. No. 08/297,198, filed Aug. 29, 1994, now abandoned.

Attention is directed to U.S. application Ser. No. 08/297, 201 (D/94225) filed Aug. 29, 1994, titled "PUZZLE CUT SEAMED BELT WITH BONDING BETWEEN ADJACENT SURFACES BY UV CURED ADHESIVE," issued as U.S. Pat. No. 5,487,707 U.S. application Ser. No. 08/297, 200 (D/94226) filed Aug. 29, 1994 titled "ENDLESS PUZZLE CUT SEAMED BELT," issued as U.S. Pat. No. 5,514,436 and copending U.S. application Ser. No. 08/297, 203 (D/94227) filed Aug. 29, 1994 titled "PUZZLE CUT SEAMED BELT WITH BONDING BETWEEN ADJACENT SURFACES," all commonly assigned to the assignee of the present invention and filed concurrently herewith.

BACKGROUND OF THE INVENTION

The present invention is directed to an endless flexible seamed beat having improved seam quality and smoothness with substantially no thickness differential between the seamed portion of the belt and the adjacent portions of the belt and having a strength enhancing bond formed in voids between mutually mating elements of the belt of a material which is chemically and physically compatible with the belt material.

Perhaps, the most important invention that may have ever been made was that of the wheel. Arguably, one of the follow-on inventions of almost equal importance was directed to a belt. Initially, the belts were fabricated by taking two ends of a web material and fastening them together by a variety of techniques such as sewing, wiring, stapling, providing adhesive joints, etc. While such joined or seamed belts are suitable for many applications, such as the delivery of rotary motion from a source such as a motor, to implement a device such as a saw blade, they are not as satisfactory in many of the more sophisticated applications of belt technology in common practice today. In the technology of the current day many applications of belts require much more sophisticated qualities and utilities and in particular for such special applications as in electrostatographic and electrographic imaging apparatus and processes for use as photoreceptors, intermediate sheet and/or image transport devices, fusing members or transfix devices it is ideal to provide a seamless belt whereby there is no seam in the belt which mechanically interferes with any operation that the belt performs or any operation that may be performed on the belt. While this is ideal the manufacture of seamless belts requires rather sophisticated manufacturing processes which are expensive and are particularly more sophisticated, difficult and much more expensive for the larger belts. As a result, various attempts have been made to provide seamed belts which can be used in these processes. Previous attempts to manufacture seamed belts have largely relied on belts where the two ends of the belt material have been lapped or overlapped to form the seam or have butted against one another and then fastened mechanically by heat or other means of adhesion such as by the use of an adhesive or ultrasonic welding.

The belts formed according to the typical butting technique while satisfactory for many purposes are limited in bonding strength and flexibility because of the limited contact area formed by merely butting the two ends of the belt material. Furthermore, belts formed according to the butting or overlapping technique provide a bump or other discontinuity in the belt surface leading to a height differential between adjacent portions of the belt, of 0.010 inches or more depending on the belt thickness, which leads to performance failure in many applications. For example, one of the most severe problems involves cleaning the imaging belt of residual toner after transfer of the toner image. Intimate contact between the belt and cleaning blade is required. With a bump, crack or other discontinuity in the belt the tuck of the blade is disturbed which allows toner to pass under the blade and not be cleaned. Furthermore, seams having differential heights may when subjected to repeated striking by cleaning blades cause the untransferred, residual toner to be trapped in the irregular surface of the seam. Furthermore, photoreceptors which are repeatedly subjected to this striking action tend to delaminate at the seam when the seam is subjected to constant battering by the cleaning blade. As a result, both the cleaning life of the blade and the overall life of the photoreceptor can be greatly diminished as well as degrading the copy quality. In addition, such irregularities in seam height provide vibrational noise in xerographic development which disturb the toner image on the belt and degrades resolution and transfer of the toner image to the final copy sheet. This is particularly prevalent in those applications requiring the application of multiple color layers of liquid or dry developer on a photoreceptor belt, which are subsequently transferred to a final copy sheet. In these applications, it is desired to provide a seam height differential between the seam and the unseamed adjacent portions less than 0.001 inches. In addition, the presence of the discontinuity in belt thickness reduces the flex life and continuity of strength of the belt which for prolonged use is desirably 80–90% that of the parent material unseamed. In addition, the discontinuity or bump in such a belt may result in inaccurate image registration during development, inaccurate belt tracking and overall deterioration of motion quality, as a result of the translating vibrations.

While the endless puzzle cut seamed belt described in the above referenced U.S. application Ser. No. 08/297,200 (D/94226) performs satisfactorily in many applications, there are additional applications in which a more secure joining of the ends of the belt at the seam are desired. It is to this end that the present invention is directed.

SUMMARY OF THE INVENTION

Accordingly, it is a principle object of the present invention to provide a seamed belt with mechanically invisible seams substantially equivalent in performance to that of a seamless belt.

It is a further object of the present invention to provide an endless seamed belt where there is substantially no bump or height differential between the, seamed portions and unseamed portions on each side of the seam, leading to performance failure, or degradation of cleaning blade performance, image registration, belt tracking or motion quality from translating vibrations.

According to a principle aspect of the present invention the above objects are obtained by providing a flexible seamed belt formed by joining two ends of the belt material having a plurality of mutually mating elements in a puzzle cut pattern of nodes which are in an interlocking relationship plane to prevent separation of the ends and which form a seam when joined mechanically enable the seamed flexible belt to essentially function as an endless belt having a substantially uniform thickness. And, wherein the seam has a kerf or voids between mutually mating elements at least partially filled with a seam strength enhancing material which is chemically and physically compatible with the material from which the belt is fabricated and which is bound to the belt material, the reinforcing bond having been formed by the application of heat and/or pressure to a strip of the compatible material or a substrate having a coating of the compatible material placed on at least one side of the seam and substantially covering the seam. After the bond is formed the substrate may be removed.

In a further aspect of the present invention a strip of the compatible material is present on both sides of the seam and the strength enhancing material maybe the same or a different material from that which the belt is fabricated.

In a further aspect of the present invention the belt material is softened by the application of heat and the strip of compatible material is melted by the application of heat and is present in sufficient quantity to fill the voids between mutually mating elements.

In a further aspect of the present invention the reinforcing bond between the belt material and the seam strength enhancing material is formed by ultrasonic or impulse welding with the simultaneous application of heat and pressure.

In a further aspect of the present invention the volume of the strip of compatible material when melted is sufficient to fill the voids between the mutually mating elements.

It is a further principle aspect of the present invention that there is no substantial thickness differential in the seam between strength enhancing material and the adjacent interlocking mating belt elements.

It is a further aspect of the present invention that the opposite surfaces of the puzzle cut pattern be bound together with sufficient physical integrity to enable the seamed flexible belt to essentially function as an endless belt.

It is a further aspect of the present invention wherein the interlocking elements all have curved mating surfaces.

It is a further aspect of the present invention wherein the mutual mating elements are male and female interlocking portions and wherein the mating interlocking elements have the same configuration.

It is a further aspect of the present invention wherein each of the interlocking elements has a post portion and a larger head portion.

In a further aspect of the present invention the mutual mating interlocking elements form a dovetail pattern.

In a further aspect of the present invention the post portion and head portion form interlocking nodes.

It is a further aspect of the present invention to provide a seamed belt wherein the height or thickness differential between the seamed and unseamed portions is less than 0.001 inch.

It is a further aspect of the present invention to provide a seam in a seamed belt having at least 80% and preferably 90% of the tensile strength of the parent belt material.

It is a further aspect of the present invention to provide a seamed belt having the seam bond, strength and flexibility capable of at least 500,000 cycles without seam failure.

BRIEF DESCRIPTION OF THE DRAWINGS

FIGS. 6A, 6B and 6C are three representations of the puzzle cut configuration which will be discussed hereinafter.

DESCRIPTION OF PREFERRED EMBODIMENT

Figure 1:
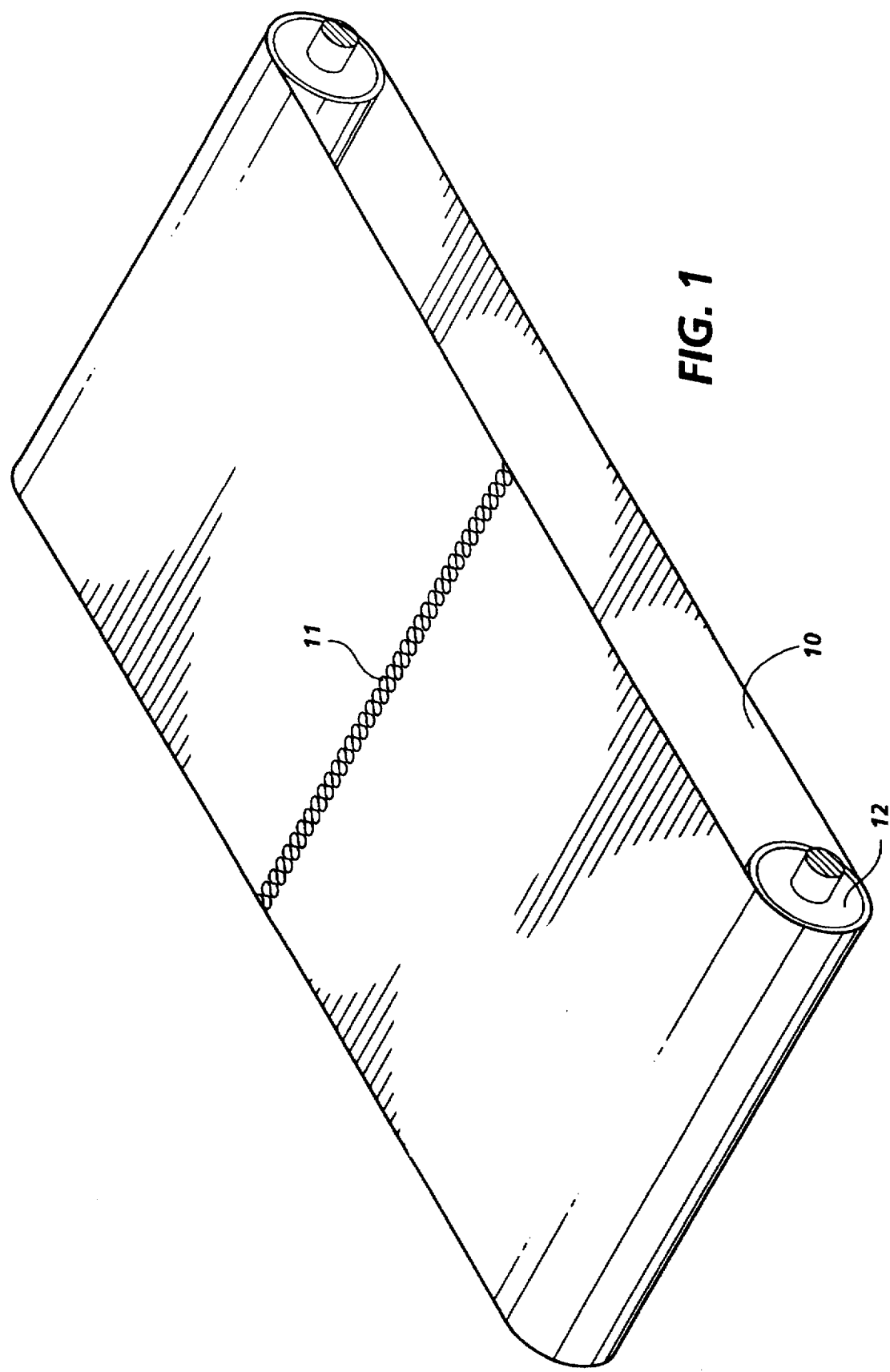
FIG. 1 is an isometric representation of the flexible puzzle cut seamed belt formed according to the present invention providing a mechanically invisible and substantially equivalent seam in performance to that of a seamless belt.

With continued reference to the Figures and additional reference to the following description the invention will be described in greater detail. The seam formed according to the present invention is one of enhanced strength, flexibility and mechanical life which is held together by the geometric relationship between the ends of the belt material, which are fastened together by a puzzle cut, meaning that the two ends interlock with one another in the manner of an ordinary puzzle together with chemically and physically compatible seam strength enhancing material at least partially filling the kerf or voids between mutually mating elements of the seam which has been formed by the application of heat and/or pressure to a strip of the compatible material which at least substantially covers the seam. This provides an improved seam quality and smoothness with substantially no thickness differential between the seam and the rest of the belt, thereby providing enhanced imaging registration and control as discussed above. Further, it should be noted that the lower the differential in height the faster that the belt may travel. Referring to FIG. 1, it should be noted that the mechanical interlocking relationship of the seam 11 is present in a two dimensional plane when the belt 10 is on a flat surface, whether it be horizontal or vertical. While the seam is illustrated in FIG. 1 as being perpendicular to the two parallel sides of the belt it will be understood that it may be angled or slanted with respect to the parallel sides. This enables any noise generated in the system to be distributed more uniformly and the forces placed on each mating element or node to be reduced. It is desired that the seam height differential between seemed and adjacent unseamed portions be less than 0.001 inches, that the flex life and continuity of strength be 80 to 90% of the belt material and that the seam bond strength and flexibility capable of at least 500,000 cycles without seam failure. In a particular application this provides a belt life of 2 million prints.

The endless flexible seamed belt may be made of any suitable material. Typical materials include, photoreceptor materials which may be multilayered such as those described in U.S. Pat. No. 4,265,990, as well as a variety of thermoplastic and thermosetting belt materials. Any suitable belt material may be employed. Typical materials include polyesters, polyurethanes, polyimides, polyvinyl chloride polyolefins such as polyethylene and polypropylene and polyamides such as nylon, polycarbonates and acrylics. In addition, elastomeric materials such as silicones, fluorocarbons such as Vitons E. I. DuPont™, EPDM and nitriles etc. For certain purposes metallic cloth and even paper may be used. The belt material is selected to have the appropriate physical characteristics for specific utilities such as tensile strength, Young's modulus, typically $1 \times 10^3$ to $1 \times 10^6$ psi; electroconductivity, typically $10^8$ to $10^{11}$ ohm cm volume resistivity, thermal conductivity, stability, flex strength and in certain applications, such as transfix, being capable of being subjected to high temperatures. Other important characteristics of the belt material, depending on its use, include surface energy desired low for good toner release, for example, gloss, dielectric constant and strength.

The puzzle cut pattern may be formed according to any conventional shaping technique, such as by die cutting or laser cutting with commercially available lasers, such as a $CO_2$ laser or excimer laser generating a beam of sufficient width and intensity that within an acceptable time will provide the desired cut. Following cutting by the laser beam it can be deburred and cleaned by air, ultrasonics or brushing if necessary. In addition to puzzle cut patterns formed by joining the two ends, they may be formed on each of the ends by a male and female punch with the belt material in between which punches out the shape. Alternatively, it could be a pattern on a wheel which rolls over the material.

Figure 2:
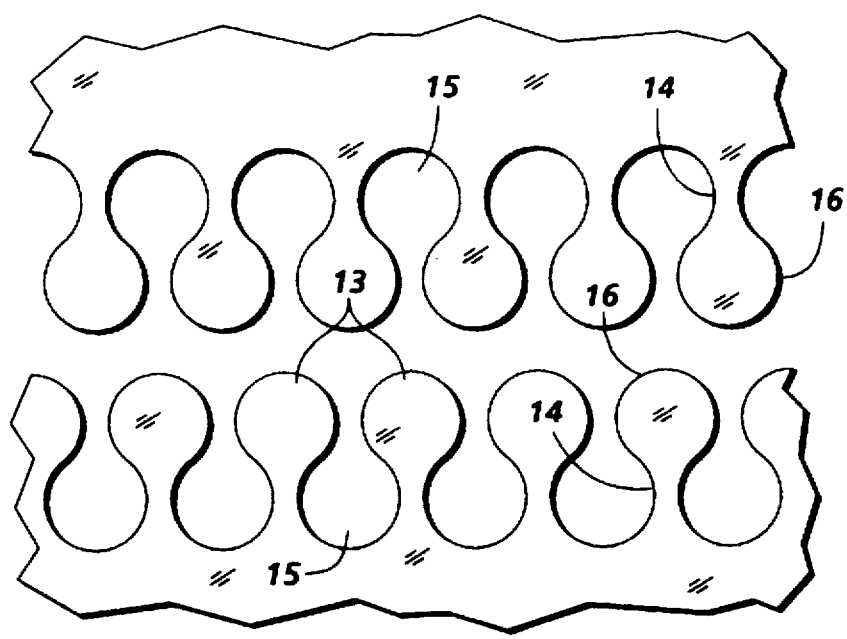
FIG. 2 is an enlarged view of a puzzle cut pattern used on both joining ends of the belt material to provide interlocking elements having a post portion 14 and a larger head portion 16.
Figure 3:
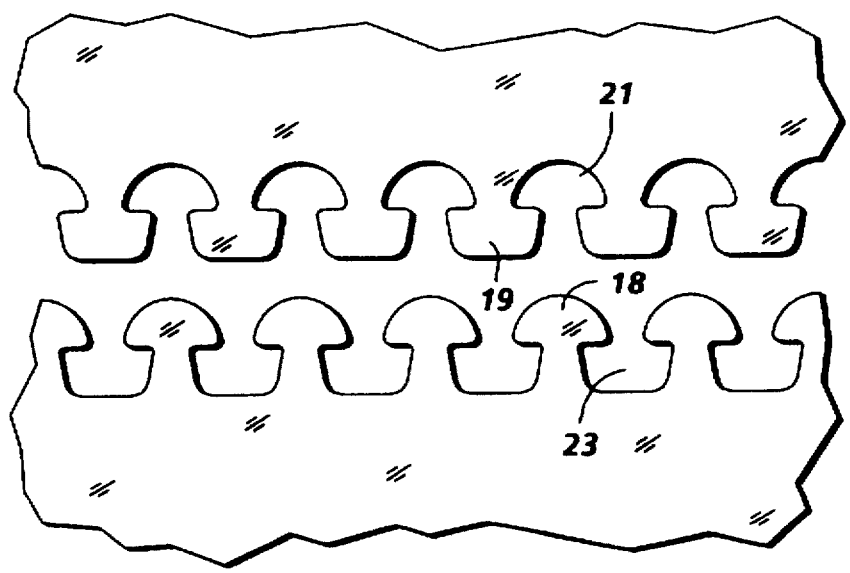
FIG. 3 is illustrative of an alternative configuration wherein male 18, 19 and female 21, 23 interlocking portions having curved mating elements are used in the two ends of the belt material which are joined.
Figure 4:
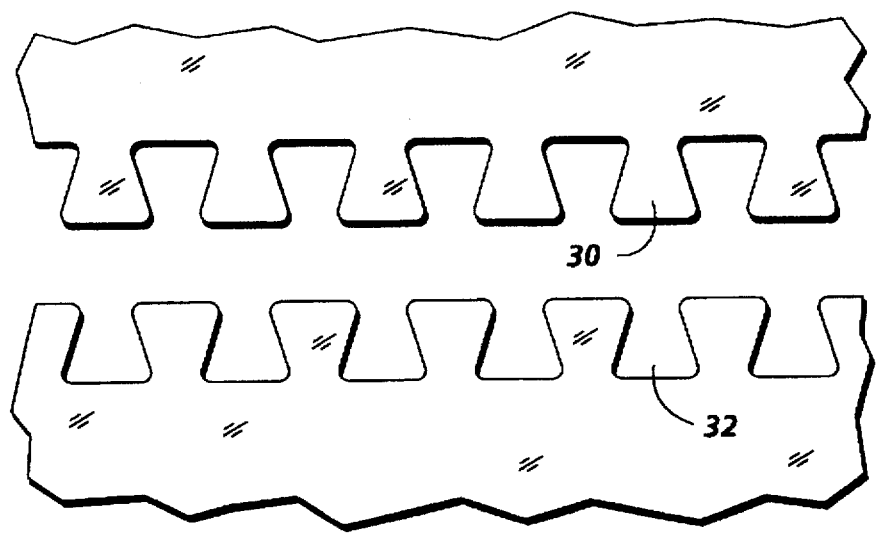
FIG. 4 is a further alternative embodiment wherein the interlocking elements 30, 32 form a dovetail pattern having curved mating elements.
Figure 5:
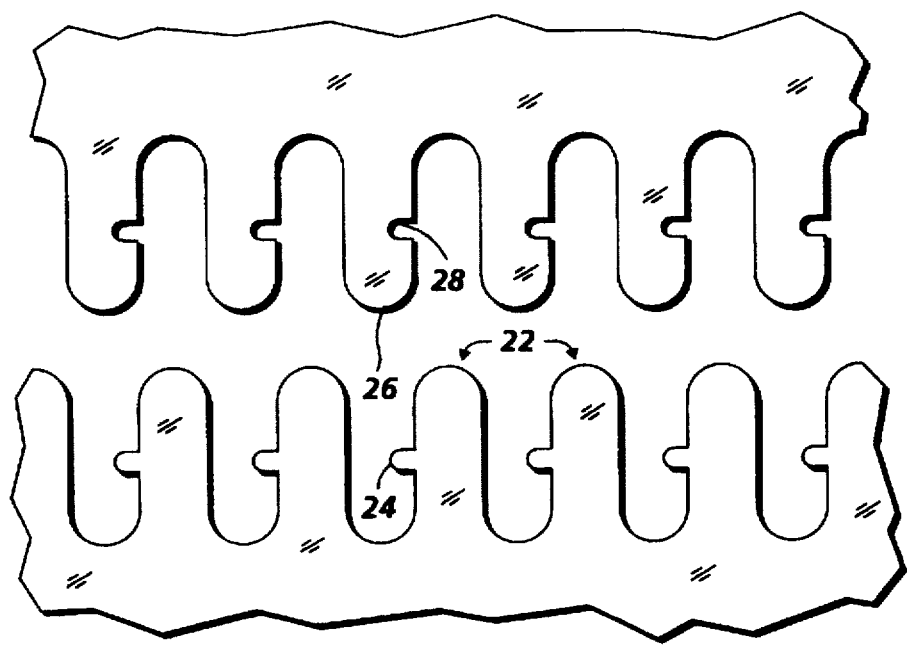
FIG. 5 is an additional alternative embodiment wherein the interlocking relationship between the puzzle cut pattern on both ends is formed from a plurality of finger joints 22, 26.
Figure 7:
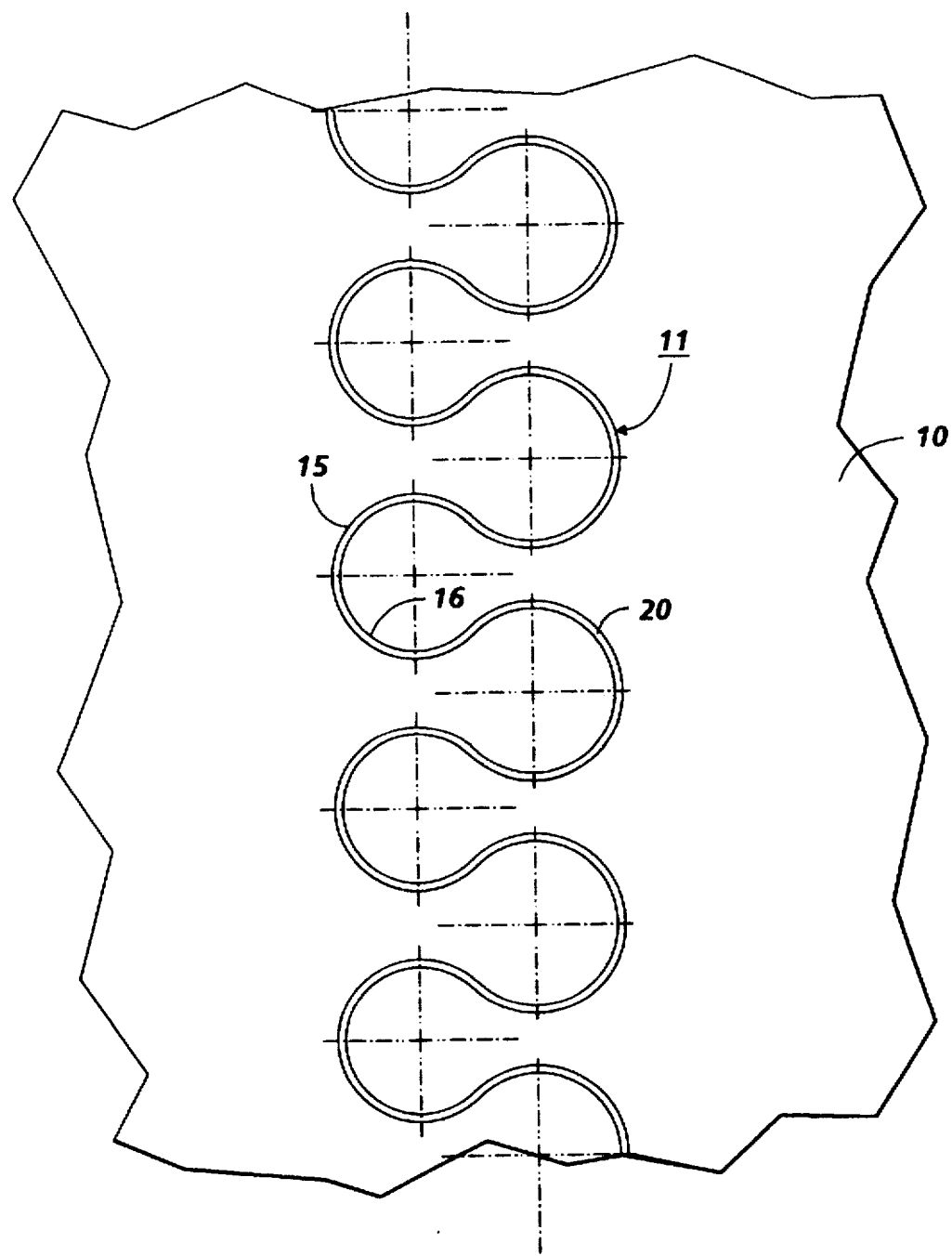
FIG. 7 is a greatly exaggerated in scale representation illustrating essentially a small kerf or space 20 between interlocking elements which may for example be each precision die cut or laser cut from two separate pieces of material wherein the cutting of one element may be compensated for the kerf or space between elements.
Figure 8:
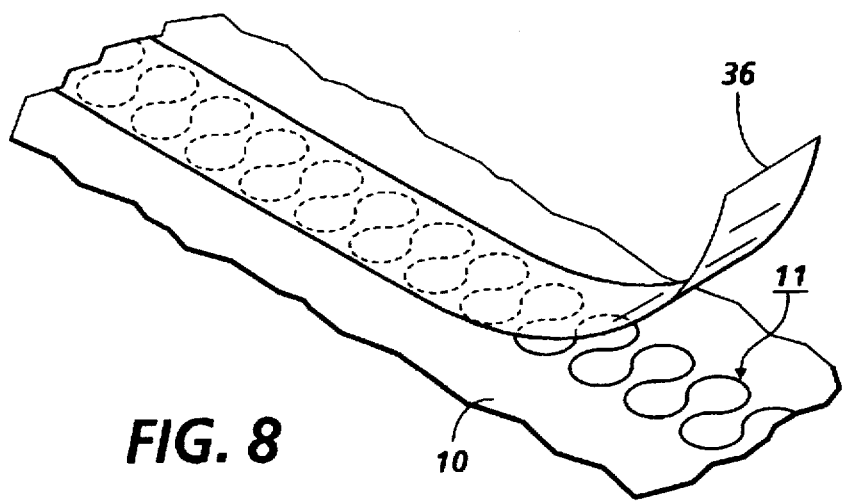
FIG. 8 is a representation of a belt seam having a strip 36 of belt compatible material over the seam 11 on one side of the seam prior to the application of heat and/or pressure to the strip of the material to at least partially fill the voids between mutually mating seam elements.
Figure 9:
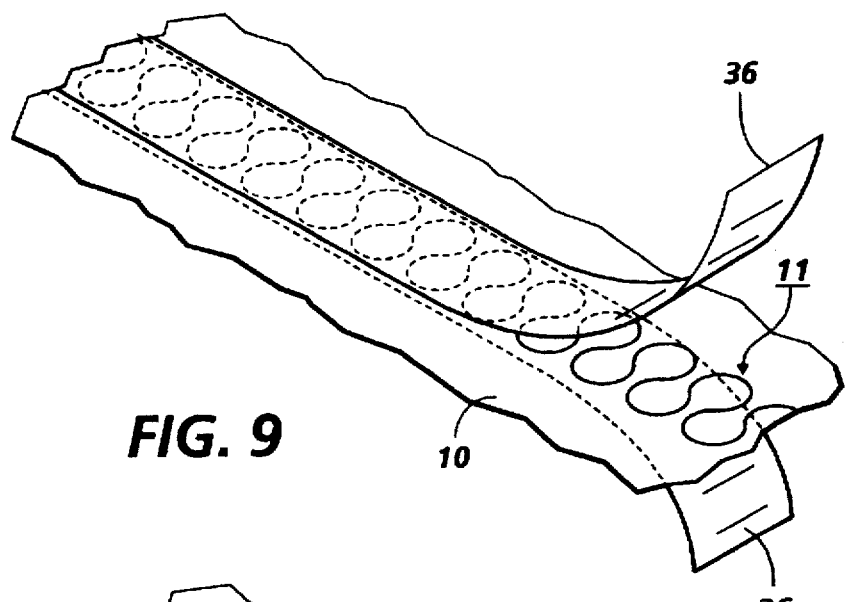
FIG. 9 is a similar representation of that in FIG. 6 wherein a strip 36 of the compatible material is placed on both sides of the belt seam 11.
Figure 10:
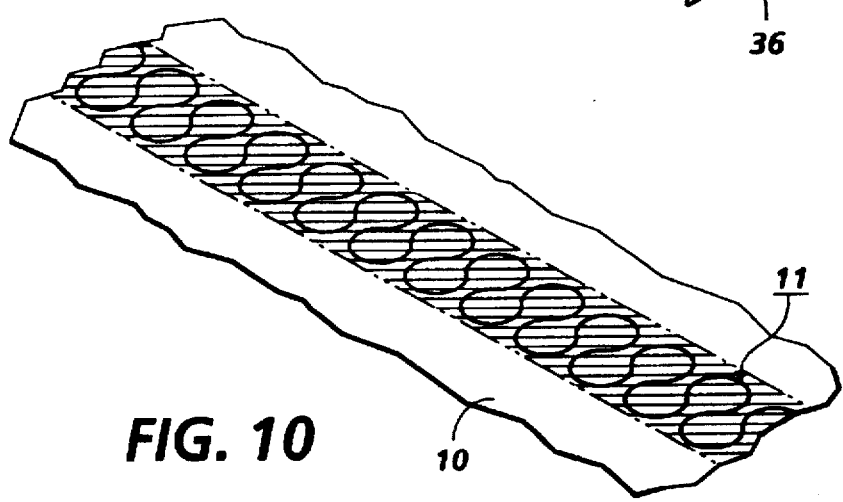
FIG. 10 is a representation of the belt seam 11 after the strip of belt compatible material has had heat and/or pressure applied to strip, enabling the strip material to at least partially fill the voids between mutually mating seam elements.

As may be observed from the drawings, the puzzle cut pattern may take virtually any form, including that of nodes such as identical post or neck 14 and head 16 patterns of male 13 and female 15 interlocking portions as illustrated in FIG. 2, or a more mushroom-like shaped pattern having male portions 18 and 19 and female portions 21 and 23 as illustrated in FIG. 3 as well as a dovetail pattern having male portions 30 and female portions 32 as illustrated in FIG. 4. The puzzle cut pattern illustrated in FIG. 5 has a plurality of male fingers 22 with interlocking teeth 24 and plurality of female fingers 26 which have recesses 28 to interlock with the teeth 24 when assemblied. It is important that the interlocking elements all have curved mating elements to reduce the stress concentration between the interlocking elements and permit them to separate when traveling around curved members such as the rolls 12 of FIG. 1. It has been found that with curved mating elements that the stress concentration is lower than with square corners where rather than the stress being uniformly distributed it is concentrated leading to possible failure.

The mechanical bonding strength and flexibility of the bond should be capable of supporting a belt cycling of at least 500,000 cycles and the height differential between the seamed portion and the unseamed portion on each side of the seam about 0.001 inch and the seam have a tensile strength of at least 80% and preferably 90% of the parent belt material strength.

The following is a discussion of the interrelationship among the various belt and material parameters involved in the mechanical integrity of the seam.

The mechanical integrity of the seam was examined and analyzed for a number of configurations and in particular for the preferred configuration which involves nodes forming parts of a circle and interconnecting via a neck on the opposite side. To determine the deflection under loading conditions, each such node is treated as a beam fixed at the narrowest part of the neck joining the node to the base and the deflection of each tooth (node and neck) is calculated in terms of the orientation of the load relative to the beam. To assure that the seam will not come apart under load, it is imposed that the maximum deflection of each tooth, when the load, under worse conditions, is normal to the beam, would not exceed the thickness of the belt itself. Clearly, if the deflection of the tooth is in excess of the thickness of the belt then the seam will come apart. Under the above brief analysis, a master relationship connecting a material parameter M typical of the configuration with a geometric parameter G such that the belt will not come apart under loading.

$$M = \frac{1-G}{\left(1+\sqrt{4-\frac{1}{G^2}}\right)^3} \tag{1}$$

In this relationship M is a dimensionless quantity given by $$M = \frac{4NR^3}{Et^4} \tag{2}$$

and G represents the ratio $$G = 2R/w \tag{3}$$

where N is the total load per unit width (i.e. lbs/in.) acting on the belt, E is the modulus of elasticity of the belt material t, the thickness of the belt, R the radius of the circular node forming the seam, and w is the wave length of one whole period between two adjacent nodes. Equation (1) is a one-to-one relationship between the material parameter M and the geometric parameter G. Thus, given one of them we can find the other parameter. Furthermore, because of the dimensionless nature of these two parameters, a multitude of configurations are embodied in each pair of values satisfying equation (1), by virtue of the fact that there is an infinite number of combinations of the variables involved in that particular pair of values of M and G. Inspection of the geometry of the node shows that the structure is characterized by two main features: the shoulder, or that portion where there is interference between adjacent teeth, which supports the seam, and the neck of each tooth which represents its strength under loading. The size of the shoulder should be sufficient to insure mechanical integrity of the seam without making the neck too small as to weaken its strength. In this regard attention is directed to FIGS. 6A, 6B and 6C wherein it can be visually observed that the size of the neck in FIG. 6A is too small and the size of the shoulder in FIG. 6C does not provide sufficient interference contact while the geometry in FIG. 6B appears to be optimum. Table 1 below lists the various parameters for the identified belt characteristics. While all samples will function as noted above, a value of G of 0.6 is a good compromise. Many of the samples of course are impractical to implement relative to factors such as manufacturing ease, costs, stress tolerance, etc. Equation (3) shows that G can only vary between ½ and 1, the first value refers to the case when the shoulder is zero, and the second value pertains to the case when the neck of the tooth is zero and the node has no strength. Once either M or G is known the entire configuration becomes determinate with the help of the above equations and other standard geometric relationships. Measurements on actual belts have generally confirmed the above analysis. To illustrate the solution methodology, suppose a belt material of Young's modulus $E=5\times10^5$ psi and thickness $t=0.004"$ is subjected to a tension $N=2.0$ lb./in. of belt width. H is the perpendicular height between centers of one node or one side of the seam and a node on the other side of the seam. The solution possibilities are given in Table 1 below such that the seam will not come apart. If a value G=0.6 is chosen as a compromise between seam integrity and node strength, we find Node Diameter D = 0.448 mm
Period w = 0.747 mm
Neck Width g = 0.299 mm
Node Height H = 0.69696
N, lb/in = 2.0
E, psi = 500000
t, in = .004

| G | 1/M | D | W | g | H |
|---|---|---|---|---|---|
| .5000 | 2.000 | 1.0160 | 2.0320 | 1.0160 | 1.0160 |
| .5100 | 5.5296 | .7239 | 1.4194 | .6955 | .8665 |
| .5200 | 7.7482 | .6469 | 1.2440 | .5971 | .8246 |
| .5300 | 9.7913 | .5984 | 1.1290 | .5306 | .7968 |
| .5400 | 11.7592 | .5629 | 1.0424 | .4795 | .7755 |
| .5500 | 13.6903 | .5351 | .9729 | .4378 | .7580 |
| .5600 | 15.6054 | .5122 | .9147 | .4025 | .7429 |
| .5700 | 17.5179 | .4929 | .8647 | .3718 | .7295 |
| .5800 | 19.4383 | .4761 | .8208 | .3448 | .7174 |
| .5900 | 21.3751 | .4612 | .7818 | .3205 | .7061 |
| .6000 | 23.3363 | .4479 | .7466 | .2986 | .6956 |
| .6100 | 25.3292 | .4359 | .7146 | .2787 | .6856 |
| .6200 | 27.3614 | .4248 | .6852 | .2604 | .6760 |
| .6300 | 29.4406 | .4146 | .6580 | .2435 | .6668 |
| .6400 | 31.5747 | .4050 | .6328 | .2278 | .6578 |
| .6500 | 33.7722 | .3960 | .6093 | .2132 | .6491 |
| .6600 | 36.0424 | .3875 | .5872 | .1996 | .6405 |
| .6700 | 38.3950 | .3794 | .5663 | .1869 | .6320 |
| .6800 | 40.8411 | .3717 | .5466 | .1749 | .6236 |
| .6900 | 43.3927 | .3643 | .5279 | .1637 | .6153 |
| .7000 | 46.0632 | .3571 | .5101 | .1530 | .6070 |
| .7100 | 48.8678 | .3501 | .4931 | .1430 | .5987 |
| .7200 | 51.8235 | .3433 | .4769 | .1335 | .5904 |
| .7300 | 54.9497 | .3367 | .4612 | .1245 | .5820 |
| .7400 | 58.2687 | .3302 | .4462 | .1160 | .5736 |
| .7500 | 61.8060 | .3238 | .4317 | .1079 | .5651 |
| .7600 | 65.5913 | .3174 | .4176 | .1002 | .5565 |
| .7700 | 69.6594 | .3111 | .4040 | .0929 | .5477 |
| .7800 | 74.0510 | .3048 | .3908 | .0860 | .5388 |
| .7900 | 78.8149 | .2986 | .3779 | .0794 | .5297 |
| .8000 | 84.0090 | .2923 | .3653 | .0731 | .5204 |
| .8100 | 89.7035 | .2860 | .3530 | .0671 | .5109 |
| .8200 | 95.9840 | .2796 | .3410 | .0614 | .5012 |
| .8300 | 102.9563 | .2731 | .3291 | .0559 | .4911 |
| .8400 | 110.7522 | .2666 | .3173 | .0508 | .4807 |
| .8500 | 119.5388 | .2599 | .3057 | .0459 | .4700 |
| .8600 | 129.5306 | .2530 | .2942 | .0412 | .4588 |
| .8700 | 141.0081 | .2459 | .2827 | .0367 | .4472 |
| .8800 | 154.3451 | .2386 | .2712 | .0325 | .4350 |
| .8900 | 170.0512 | .2311 | .2596 | .0286 | .4222 |
| .9000 | 188.8397 | .2231 | .2479 | .0248 | .4086 |
| .9100 | 211.7410 | .2148 | .2360 | .0212 | .3942 |
| .9200 | 240.2999 | .2059 | .2238 | .0179 | .3787 |
| .9300 | 276.9445 | .1964 | .2112 | .0148 | .3620 |
| .9400 | 325.7211 | .1860 | .1979 | .0119 | .3436 |

-continued

Node Diameter D = 0.448 mm
Period w = 0.747 mm
Neck Width g = 0.299 mm
Node Height H = 0.69696
N, lb/in = 2.0
E, psi = 500000
t, in = .004

| G | 1/M | D | W | g | H |
|---|---|---|---|---|---|
| .9500 | 393.9129 | .1746 | .1838 | .0092 | .3231 |
| .9600 | 496.0860 | .1617 | .1684 | .0067 | .2997 |
| .9700 | 666.2290 | .1466 | .1511 | .0045 | .2722 |
| .9800 | 1006.3020 | .1277 | .1303 | .0026 | .2376 |
| .9900 | 2026.1140 | .1012 | .1022 | .0010 | .1885 |

To minimize any time out or nonfunctional area of the belt it is desirable to have the seam width be as narrow as possible. Further, this enables the seam to be indexed so that it does not participate in belt functionality such as the formation and transfer of a toner or developer image. Typically, the seam is from about 1 mm to about 3 mm wide.

With reference to the embodiment illustrated in FIG. 2, the seam may be typically of the order of one inch wide on a belt which is 16 to 18 inches long depending on roll diameter, material modulus or other parameters and the post and head pattern may be formed from a male/female punch cut with each end being cut separately and subsequently being joined to form the seam with a roller similar to that used as a wall paper seamer rolled over the seam by hand to complete the interlocking nature of the puzzle cut pattern.

The two ends of the belt material are joined by physically placing them together in interlocking relationship. This may require the application of pressure to properly seat or mate the interlocking elements.

As previously discussed, in addition, the endless flexible seamed belt being joined by a plurality of mutually mating elements in a puzzle cut pattern in interlocking relationship to form a seam, the seam has a kerf or voids between the mutually mating elements which are at least partially filled with a seam strength enhancing material which is chemically and physically compatible with the material from which the belt is fabricated and which is bound to the belt material. This bond is formed by the application of heat and/or pressure to a strip of the compatible material which is placed on at least one side of the seam at least substantially covering the seam and may be placed on both sides of the seam. The strength enhancing material may be the same or it may be different from the material from which the belt was fabricated and may be selected from those materials previously discussed and it may be either chemically, and/or physically bound to the belt material. A typical material may be a polycarbonate which may be unfilled or filled with carbon fibers to suppress wrinkling of the material. The strength enhancing material may be applied as a strip over the seam or as a coating on a substrate which may be removed after the bond has been formed. Typical such substrates include commercially available polyamides and polyesters such as Mylar.

Figure 11:
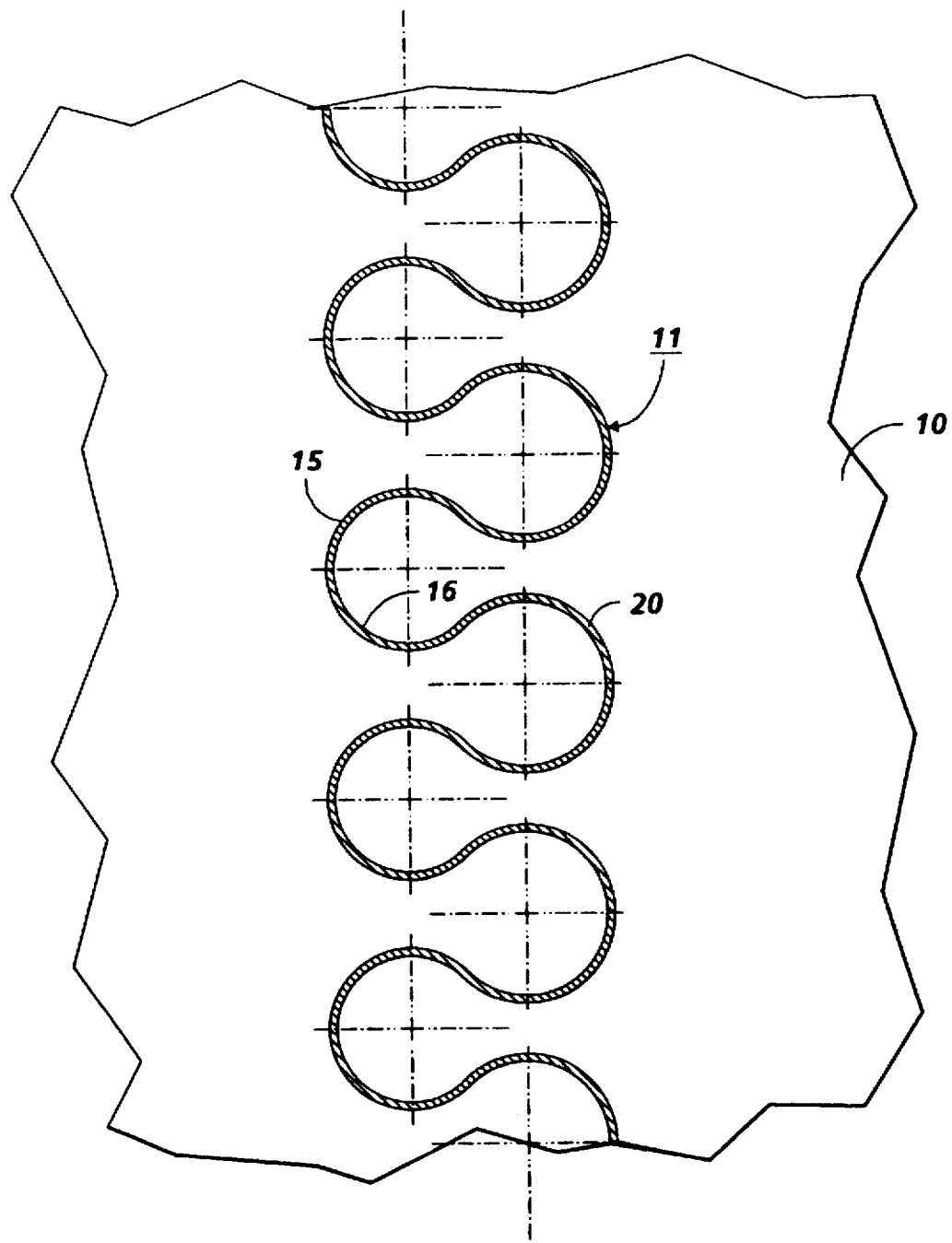
FIG. 11 is a greatly exaggerated representation of the belt seam 11 with the kerr 20 filled with belt compatible material 17 represent by the cross hatching.

While the compatible material in the seam strength enhancing strip is melted to fill the voids between the mutually mating elements it is possible, but not necessary to melt the belt seam material. This may have the effect of maximizing adhesion between the belt seam material and the strength enhancing material and has particular application when both materials are polycarbonates. However, in other applications it may be only necessary to soften a belt material such as, for example, if the belt material is a polyester such as Mylar and the seam strength enhancing material is a polyester strip. Typically, the materials that can be applied as the seam strength enhancing materials are those that can also be applied in the fabrication of the belt itself. The chemical and/or physical bond between the seam strength enhancing material and the belt material may be formed by the application of heat and/or pressure to a strip of the compatible material when the strip is placed on at least one side of the seam covering the seam. In a particular application impulse welding may be applied wherein heat and pressure are simultaneously applied to the strip to at least soften the belt material and melts the strength enhancing material 17 (see FIG. 11) so that it fills the kerr and forms an adhesive bond with the belt material. In this regard, it is important that the heat applied does not exceed that which would both form the seam and break it by melting it or decomposing it. Other heat sources include conventional heated rolls, a simple heated iron, ultrasonic welding or a two roll heated nip providing a combination of heat and pressure.

Preferably, the size of the strip of the seam strength enhancing material is at least as wide as the seam and not narrower than the seam and is of a thickness to provide a quantity of adhesive to fill the kerr spaces between the two sides of the puzzle cut seam member. In this regard it should also be noted that it may be possible to first apply the heat to the seam of the belt material and the strength enhancing material and subsequently apply pressure while it is still in a softened condition to force the softened strength enhancing material into the spaces between the two sides of the puzzle cut seam members. The pressure applied should be sufficient to fill the kerr and to minimize thickness of any bonded joint. While this process clearly provides a physical bonding between material of the belt seam and the seam strength enhancing material, it may also provide a chemical bond. A typical example of this would be one wherein the belt material is a polyimide and the seam strength enhancing material is a polyamide strip.

The following examples illustrates the assembly and testing of a seamed belt having a plurality a puzzle cut seam according to the practice of the present invention.

EXAMPLE I

Using a die cutter one inch wide polyimide material was mechanically cut to provide a radius of the nodes of about 0.5 mm and the center to center spacing of about 0.70 mm. The ends of the strip of the one inch width polyimide material were then interlocked and rolled with the roller to flatten the seam. A thermoplastic polyamide web material was placed on the lower jaw of an impulse welder Vertrod Corp. Model No. 24H/HT1/4. The previously joined seam was centered over the webbing material, heated at approximately 350° F. and light pressure applied for approximately 20 seconds to melt the polyamide web material into the seamed area. The samples were tested in a flex tester using a two pound load, on a one inch by 12 inch long belt and 17 inch per second process speed around the 25 mm drum rollers. The test results of the four samples, each exceeded 500,000 cycles and the four averaged over 900,000 cycles.

EXAMPLE II

A similar procedure was followed in preparing a polycarbonate seamed belt laminated with polyvinyl fluoride, Tedlar having a similar puzzle cut joined with a strip of the polycarbonate large enough to cover the seamed area placed on the top portion of the puzzle cut seam. The joint was held in place by a vacuum and welded by the impulse welder which provided a temperature of 250° F. and a pressure of 50 psi for about 0.1 second. Through the dual electrical elements/top bottom jaws heat and pressure were applied to flow the polycarbonate strip into the polycarbonate substrate.

EXAMPLE III

A multi-layer photoreceptor belt such as described in U.S. Pat. No. 4,265,990 was cut into a puzzle cut joint and a strip of the Mylar photoreceptor substrate large enough to cover the seam area was placed on the top portion of the puzzle cut seam. The joint was held in place by a vacuum and was welded by the impulse welder which provided sufficient heat and pressure to 250° F., 50 psi to flow the Mylar into the puzzle cut seam.

The seamed belt according to the present invention may be fabricated in an environmentally acceptable manner in that no solvents are required and the thickness of the seam strength enhancing material may be controlled by controlling the thickness of the strip or substrate on which it may be coated.

Thus, according to the present invention an endless flexible seamed belt is formed which is mechanically invisible and substantially equivalent in performance to a seamless belt. The seam strength enhancing material may be applied to the kerf or may be a coating on a suitable substrate which when heat is applied melts and flows into the kerf. Pressure may be applied to smooth the surface and the substrate removed. Furthermore, a seamed belt is provided by joining two ends wherein each end is fabricated having a plurality of mutually mating elements in a puzzle cut pattern which are in interlocking relationship in at least one plane to prevent separation at the ends. The assembly process enables accurate placement of the mating elements thereby permitting ease of assembly merely by mating the two pieces together and filling the kerf with reinforcing material. Further, a principle advantage is that there is no height differential between adjacent portions of the seam leading to the difficulties discussed above associated with seamed belts made by overlapping seams or a butting seam wherein a differential height is present or inadequate adhesion is present leading to vibrational noise effecting xerographic development and transfer as well as ineffectual cleaning of residual toner from a photoreceptor material from which the toner has been transferred as well as belt tracking and other features. Furthermore, it is believed that the seam so formed provides enhanced strength, flexibility, longer mechanical life and has sufficient physical integrity to enable the seamed flexible belt to essentially function as an endless belt.

The above cross referenced patent applications together with the patents cited herein are hereby incorporated by reference in their entirety in the instant application.

While the above invention has been described with reference to specific embodiments it is not intended to be limited thereto but rather those skilled in the art will recognize that variations and modifications may be made therein which are within the spirit of the scope and the appended claims.

It is claimed:

1. An endless, seamed, flexible belt comprising a flexible material having two ends that are joined to form the endless belt having a substantially uniform thickness and only a single seam, the two ends having a plurality of mutually mating elements in a puzzle cut pattern, the opposite surfaces of the two ends being in an interlocking relationship to prevent separation of the two ends, the surfaces of the mutually mating elements defining a gap therebetween, the seam including a seam strength enhancing material in the gap which is bound to the surfaces of the mutually mating elements, wherein there is absent any substantial thickness differential between the seam and the adjacent interlocking mating elements, wherein the seam extends linearly across the entire width of the belt, the shape of the mutually mating elements and the seam strength enhancing material resulting in the seam having a tensile strength at least about 80% of the tensile strength of the flexible material, and wherein the seam strength enhancing material is deposited in the gap by placing a nonpermanent strip comprising the strength enhancing material over at least one side of the seam at least substantially covering the seam and applying heat, pressure, or both, to the strip, thereby depositing the seam strength enhancing material into the gap.

2. The belt of claim 1, wherein the strip comprises a substrate with a coating of the seam strength enhancing material.

3. The belt of claim 2, wherein the belt is made by a method further comprising removing the substrate subsequent to depositing the strength enhancing material into the gap.

4. The belt of claim 1, wherein the belt is made by a method further comprising placing the strip over both sides of the seam.

5. The belt of claim 1, wherein the seam strength enhancing material and the flexible belt material have the same composition.

6. The belt of claim 1, wherein the seam strength enhancing material and the flexible belt material have different compositions.

7. The belt of claim 1, wherein the mutually mating elements all have curved mating surfaces.

8. The belt of claim 1, wherein the mutually mating elements are male and female interlocking portions.

9. The belt of claim 1, wherein all the male interlocking portions have the same configuration.

10. The belt of claim 1, wherein each mating element has a post portion and a larger head portion.

11. The belt of claim 1, wherein the mutually mating elements form a dovetail pattern.

12. The belt of claim 1, wherein the height differential between the seam and the adjacent interlocking mating elements is less than about 0.001 inch.

13. The belt of claim 1, wherein the tensile strength of the seam is at least about 90% of the tensile strength of the flexible belt material.

14. The belt of claim 1, wherein the seam extends across the width of the belt in a direction perpendicular to the parallel sides of the belt.

15. The belt of claim 1, wherein the seam extends across the width of the belt in a slanted direction relative to the parallel sides of the belt.

16. The belt of claim 1, wherein the seam has a width less than about 1 inch.

17. The belt of claim 1, wherein the seam has a width ranging from about 1 mm to about 3 mm.

18. The belt of claim 1, wherein the belt is made by a method comprising applying the heat and the pressure to the strip to flow substantially all of the strip into the gap.

19. The belt of claim 1, wherein said belt is capable of multiple belt cycling of at least about 500,000 cycles.

* * * * *